Oct. 18, 1960  J. S. ATTINELLO  2,956,760
CONTROLLABLE AND VARIABLE CONFIGURATION
EFFECT SYSTEM FOR AIRCRAFT
Filed June 21, 1955

INVENTOR
JOHN S. ATTINELLO
ATTORNEYS

2,956,760

CONTROLLABLE AND VARIABLE CONFIGURATION EFFECT SYSTEM FOR AIRCRAFT

John S. Attinello, 2504 Herbert St., Falls Church, Va.

Filed June 21, 1955, Ser. No. 517,099

9 Claims. (Cl. 244—130)

(Granted under Title 35, U.S. Code (1952), sec. 266)

The invention described herein may be manufactured and used by or for the Government of the United States of America for governmental purposes without the payment of any royalties thereon or therefor.

The present invention relates to a controllable and variable configuration effect and more particularly to means to obtain a controllable and variable configuration effect on an aircraft fuselage.

Aerodynamic research has shown that analysis of a proposed aircraft's configuration, as by the so-called Method of Characteristics, may reveal the necessity for modifying that configuration in order to obtain a low overall drag at a given range of Mach numbers, in a transonic and supersonic range. To achieve this overall drag reduction the approach is to reduce the "form (or pressure) drag" and the "wave drag." By reducing the form drag and wave drag there results a change in the pressure distribution over the aircraft. "Pressure distribution" is a commonly employed term describing the variation of static pressure over any body. These pressures vary in subsonic flow according to Bernoulli's theorem; i.e. bulges which cause increases in local velocity over the body result in local decreases in pressure. Conversely, depressions or body shape which results in decrease in local velocity over the body results in an increase in static pressure. The use and definition of pressure distribution is given in Milikan's "Aerodynamics of the Aeroplane" (1941) beginning on page 35 thereof; Bairstow's "Applied Aerodynamics" (1939) pages 346, 358–363; Sibert's "High Speed Aerodynamics" (1941) pages 29, 45–48. Hence, it has been the practice to either indent or bulge out the otherwise normal aircraft fuselage pursuant to this analysis to reduce the drag which is dependent upon the aircraft's configuration, or form, the indentation or bulge being placed at the part of the fuselage indicated by the analysis. A discussion of the aerodynamic research and practice herein mentioned is given in vol. 63, No. 11 of Aviation Week, Sept. 12, 1955, pp. 12, et seq. This practice has the disadvantage that the drag reduction occurs over a limited range of Mach numbers, and that outside of this range the drag is actually greater than for a standard fuselage configuration. Hence, for operation of the aircraft with the modified fuselage outside of the reduced drag range, there is a drag penalty imposed, plus a weight penalty, which latter is caused by the added weight necessary for the indented or bulged out configuration over the weight for the standard configuration fuselage.

The present invention, by providing blowing and/or sucking at the fuselage permits the attainment of the beneficial effects only of an indented or bulged out fuselage, i.e., the low drag, without the disadvantage of the weight penalty noted. Thus the present invention is designed to reduce the form (or pressure) drag and the wave drag by simulating fuselage modification described above. Such simulation has no effect on friction drag or induced drag. This lack of effect on friction drag or induced drag is no deterrent, however, for the importance of each type of drag varies with the aircraft configuration and the speed. For a sailplane, wave drag is zero, induced drag is small (because of the high aspect ratio) but form or pressure drag and friction drag are of major importance. On a high speed missile or aircraft wave drag and form or pressure drag are dominant, but if operating at high lift coefficients (because of the usual low aspect ratios) induced drag may be of the same order as either or both the other drag components. For most high speed configurations skin friction drag is of least importance and laminarization of the flow has not been found to be practical or worth the effort, to date. Hence, for the high speed aircraft, reduction of form and wave drags are important, while reducing skin friction drag would achieve only a small percentage gain for a very large price in weight and complexity of the system. Furthermore, by providing variation in the sucking and blowing, the low drag range may be shifted between lower and higher Mach numbers. Thus, there is obtained the advantage of low drag over a greatly extended range of Mach numbers, due to the control and variations in the configuration effects produced by the present invention.

It is therefore an object of the present invention to provide means to cause a controllable and variable configuration effect.

Another object is the provision of a means to obtain the advantages of fuselage indentation or bulging without the weight penalty disadvantage of the prior art.

A further object is to provide variable means to cause an indenting or bulging effect whereby the effect may be applied and utilized over a wide range of Mach numbers, thus permitting a decrease in drag at many operational speeds.

Other objects and many of the attendant advantages of this invention will be readily appreciated as the same becomes better understood by reference to the following detailed description when considered in connection with the accompanying drawings wherein.

Figure 1:
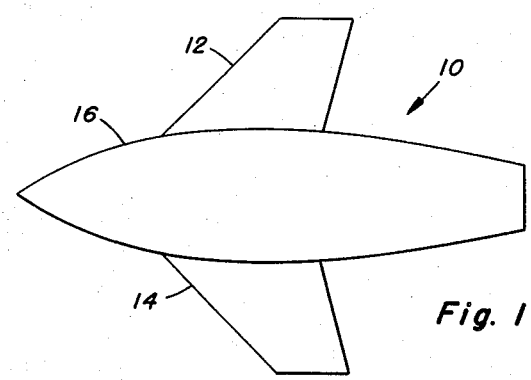
Fig. 1 is a schematic plan view of a conventional high speed aircraft.

Referring now to the drawings, wherein like reference characters designate like or corresponding parts throughout the several views, there is shown in Fig. 1 a conventional aircraft 10 having wings 12 and 14 and a fuselage 16, the sides of which are generally convex, as shown.

Figure 2:
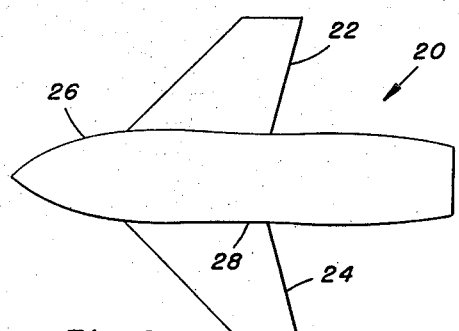
Fig. 2 is a schematic plan view of a high speed aircraft embodying structural indentation.

In Fig. 2 there is shown an aircraft 20, comprising wings 22 and 24 and fuselage 26 which is indented as at 28, so that its sides are undulating. This construction requires additional weight for the same strength.

Figure 3:
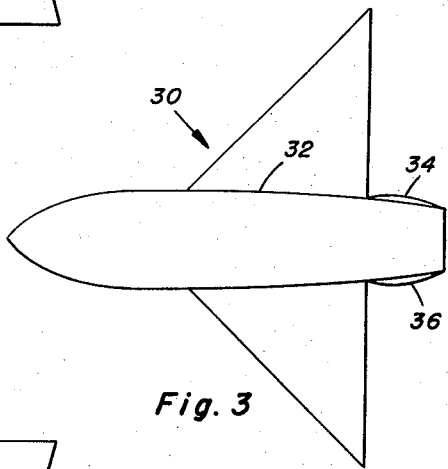
Fig. 3 is a schematic plan view of a high speed aircraft embodying bulging.

In Fig. 3 there is shown a delta wing aircraft 30 having a fuselage 32 at the rear end of which are placed bulges 34 and 36. The size and placement of the bulges are as have been indicated by an analysis, as above noted.

Figure 4:
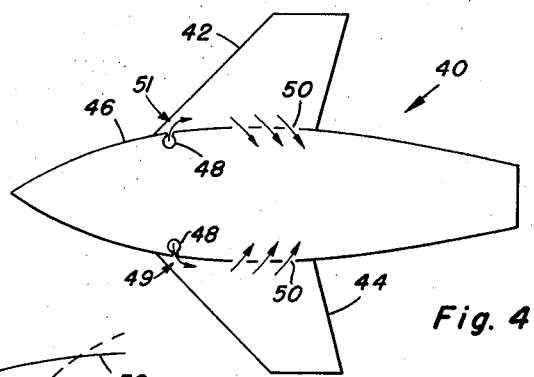
Fig. 4 is a schematic plan view of an aircraft embodying the present invention.

Fig. 4 shows an aircraft 40 having wings 42 and 44 on a fuselage 46 which has convex sides. Thus, it is, in configuration, similar to the aircraft 10 of Fig. 1. However, there is applied to the fuselage 46 a blowing element 48, and a suction element 50, both elements being located aft of the leading edge of the wing-fuselage juncture. Blowing element 48 may comprise any means to expel air outwardly of the fuselage; the speed of the expelled air is preferably supersonic. Means 48 may be connected to any convenient source of gas under pressure, such as tanks or the jet engine (not shown) of aircraft 40. Similarly, the suction element 50 may comprise any means to admit air, such as slots or a porous surface, and are conveniently connected to the jet engine.

It is within the contemplation of the invention that the means 48 and 50 may be placed in the positions determined to be most advantageous for the particular aircraft, it being apparent that each aircraft configuration will require the determination of the most effective positioning of the blowing means 48 and suction means 50. In addition, more than one of each of said means may be utilized without departing from the spirit of the invention, and the blowing means 48 and suction means 50 may be used independently. Thus, by means of such suitably placed blowing and/or suction elements a modification of the pressure distribution over the aircraft may be achieved by the effect of these elements on the air flow around the aircraft outside the boundary layer. The result is to modify the pressure distribution to duplicate that pressure distribution achieved by actual physical bulging and/or indenting of the body. The required pressure distribution for the particular aircraft for various Mach numbers can be readily determined in tunnel and flight tests. Particular pressure distributions may be altered by changing the axial distribution of the cross-sectional areas of the aircraft normal to the air flow. Thus, in a conventional (unindented) aircraft by blowing high speed air outwardly at a slight angle, the air flow is physically deflected outwardly to change the pressure distribution in the same manner as it would be changed if the same space through which the deflection occurs were occupied by a solid enlargement of the aircraft fuselage. In this manner, the pressure on the fuselage near the location of the blowing element will be increased. In a conventional (unindented) aircraft by sucking air in from the air flow there results a decrease in pressure on the fuselage near the location of the sucking element. Also, by blowing high speed air rearwardly, tangentially to a surface which is itself parallel to the flow a decrease in pressure equivalent to the decrease in pressure distribution occasioned by an indentation in the fuselage is achieved. Predetermination of the ideal pressure distribution at various points along the fuselage at various Mach numbers will enable the important aerodynamic advantage of controlling the amounts of blowing and/or suction required to achieve the optimum pressure distribution along the fuselage at almost any speed at which the aircraft is to be flown.

The blowing means 48 may exhaust tangentially to the fuselage as shown at 49 or at a slight angle, up to 20°, thereto as shown at 51: if tangential, the effect will be to alter the pressure distribution to that pressure distribution that would result from actual fuselage indentation (effective fuselage indentation); if at a slight angle, the effect will be to alter the pressure distribution to that pressure distribution that would result from an actual fuselage bulge (effective fuselage bulging). The suction means 50 will have the effect of an indentation. In either case, the effect is obtained by alteration of the pressure distribution over the aircraft.

Figure 5:
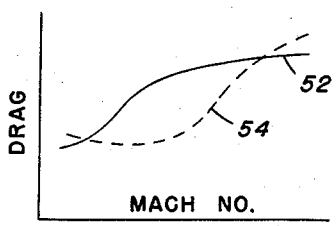
Fig. 5 is a chart of drag vs. Mach number.

In Fig. 5 there is shown a series of drag curves, plotted against Mach number, with values conventionally increasing up and to the right. As has been previously indicated actual indentation of the fuselage as is shown in Fig. 2 will prove advantageous over a given range of Mach number as compared to conventional unindented design but this is not a complete gain for at Mach numbers outside the given range the drag of the aircraft with the indented fuselage may exceed that of the unindented craft traveling at those speeds. Fig. 5 serves to illustrate this point graphically. The solid line curve, designated 52 is of a conventional aircraft, such as is shown in Fig. 1. This curve indicates that the drag increases with an increase in Mach number. Curve 54 is of a comparable aircraft with indentation, and having the general appearance of the aircraft shown in Fig. 2. As may be seen therefrom, the drag of the aircraft represented by curve 54 is considerably less over a range of Mach numbers than is the drag of the aircraft represented by curve 52. However, outside of that range, the conventional aircraft has less drag. The curve for an aircraft provided with sucking and blowing arrangements such as the aircraft of Fig. 4, in contrast, would show an extended low drag range.

Obviously many modifications and variations of the present invention are possible in the light of the above teachings. It is therefore to be understood that within the scope of the appended claims the invention may be practiced otherwise than as specifically described.

What is claimed is:

1. In an aircraft operable at transonic and supersonic speeds, a fuselage, a wing extending from said fuselage, means to alter the pressure distribution over the fuselage configuration whereby effective fuselage indentation is produced in the transonic and supersonic ranges of flight, said means being located in said fuselage between the juncture of said fuselage with the wing leading edge and the juncture of said fuselage with the wing trailing edge and comprising blowing means for expelling fluid into the air flow tangentially to said fuselage.

2. In an aircraft for transonic and supersonic flight, a fuselage, a wing extending from said fuselage, means to alter the pressure distribution over the fuselage configuration whereby effective fuselage indentation is produced in the transonic and supersonic ranges of flight, said means being located in said fuselage between the juncture of said fuselage with the wing leading edge and the juncture of said fuselage with the wing trailing edge and comprising an outlet in the fuselage wall and means to expel fluid through said outlet into the air flow tangentially to said fuselage.

3. In an aircraft for transonic and supersonic flight, a fuselage, a wing extending from said fuselage, means to alter the pressure distribution over the fuselage configuration whereby effective fuselage indentation is produced in the transonic and supersonic ranges of flight, said means being located in said fuselage between the juncture of said fuselage with the wing leading edge and the juncture of said fuselage with the wing trailing edge and comprising means to expel a gas from within said fuselage into the air flow tangentially to said fuselage at supersonic velocity.

4. In an aircraft operable at transonic and supersonic speeds, a fuselage, a wing extending from said fuselage, means to alter the pressure distribution over the fuselage configuration whereby effective fuselage bulging is produced in the transonic and supersonic ranges of flight, said means being located in said fuselage between the juncture of said fuselage with the wing leading edge and the juncture of said fuselage with the wing trailing edge and comprising blowing means to expel fluid at a small angle to said fuselage into the air flow in the general direction thereof.

5. In an aircraft operable at transonic and supersonic speeds, a fuselage, a wing extending from said fuselage, means to alter the pressure distribution over the fuselage configuration whereby effective fuselage indentation is produced in the transonic and supersonic ranges of flight, said means being located in said fuselage between the juncture of said fuselage with the wing leading edge and the juncture of said fuselage with the wing trailing edge and comprising means to suck air into the fuselage.

6. In an aircraft operable at transonic and supersonic speeds, a fuselage, a wing extending from said fuselage, means to alter the pressure distribution over the fuselage configuration whereby effective fuselage bulging is produced in the transonic and supersonic ranges of flight, said means being located in said fuselage between the juncture of said fuselage with the wing leading edge and the juncture of said fuselage with the wing trailing edge and comprising blowing means to expel gas into the air flow in the general direction thereof and at an angle of not more than 20° to said fuselage.

7. In an aircraft operable at transonic and supersonic speeds, a fuselage, a wing extending from said fuselage, means to alter the pressure distribution over the fuselage configuration whereby effective fuselage bulging and indentation are produced in the transonic and supersonic ranges of flight, said means being located in said fuselage between the juncture of said fuselage with the wing leading edge and the juncture of said fuselage with the wing trailing edge and comprising in combination blowing means to expel high velocity fluid into the air flow and suction means to suck air into said fuselage.

8. In an aircraft operable at transonic and supersonic speeds, a fuselage, a wing extending from said fuselage, means to alter the pressure distribution over the fuselage configuration whereby effective fuselage bulging is produced in the transonic and supersonic ranges of flight, said means being located in said fuselage aft of the juncture between said fuselage with the wing trailing edge and comprising blowing means to expel fluid into the air flow in the general direction thereof and at an angle of about 10° to about 20° to said fuselage.

9. In an aircraft operable at transonic and supersonic speeds, a fuselage, a wing extending from said fuselage, means in said fuselage to alter the pressure distribution over the fuselage configuration whereby effective fuselage bulging and indentation are produced in the transonic and supersonic ranges of flight, said means comprising in combination blowing means to expel high velocity fluid aft into the air flow at an angle thereto and suction means to draw air into said fuselage, said suction means being located aft of said blowing means.

References Cited in the file of this patent

UNITED STATES PATENTS

| | | |
|---|---|---|
| 2,348,792 | Dornier | May 16, 1944 |
| 2,554,187 | Griffith | May 22, 1951 |
| 2,692,742 | Schwarzmayr | Oct. 26, 1954 |
| 2,694,357 | Lee | Nov. 16, 1954 |
| 2,742,247 | Lachmann | Apr. 17, 1956 |

FOREIGN PATENTS

| | | |
|---|---|---|
| 506,007 | Great Britain | May 22, 1939 |
| 955,762 | France | July 4, 1949 |

OTHER REFERENCES

Aero Digest Magazine, Apr. 1, 1945, pages 98, 99 and 170.